United States Patent
Valenti et al.

(10) Patent No.: US 9,543,743 B2
(45) Date of Patent: Jan. 10, 2017

(54) PASS THROUGH FACEPLATE

(71) Applicant: Panduit Corp., Tinley Park, IL (US)

(72) Inventors: Joshua A. Valenti, Wheeling, IL (US); Samantha Caldera, Midlothian, IL (US); Robert E. Fransen, Tinley Park, IL (US); Michael B. Verbeek, Crown Point, IN (US); Kaustav Neogi, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 14/715,781

(22) Filed: May 19, 2015

(65) Prior Publication Data
US 2015/0364906 A1      Dec. 17, 2015

Related U.S. Application Data

(60) Provisional application No. 62/004,454, filed on May 29, 2014.

(51) Int. Cl.
*H02G 3/14*      (2006.01)

(52) U.S. Cl.
CPC ..................... *H02G 3/14* (2013.01)

(58) Field of Classification Search
CPC ............ H02G 3/083; H02G 3/22; H02G 3/30; H02G 3/36; H02G 3/386; H02G 3/081; H02G 3/14; H02G 3/18; H02G 3/286; H02G 3/288
USPC ..... 174/66, 67, 480, 481, 135, 650; 220/3.2, 220/3.5, 3.8, 241, 242; D13/156, 177, 152, 154; D8/350–353; 439/536
See application file for complete search history.

(56) References Cited

U.S. PATENT DOCUMENTS

| | | | |
|---|---|---|---|
| 4,688,747 A * | 8/1987 | Helmsdorfer ............ | H02G 3/22 174/67 |
| D399,829 S * | 10/1998 | Reed ............................ | D13/156 |
| D449,584 S * | 10/2001 | Dinh ............................ | D13/156 |
| D502,386 S | 3/2005 | Provenzano et al. | |
| D503,156 S | 3/2005 | Provenzano | |
| D540,656 S | 4/2007 | Corbin | |
| D548,572 S | 8/2007 | DeCosta | |
| D554,475 S | 11/2007 | Gorin et al. | |
| 7,390,964 B2 | 6/2008 | Gorin et al. | |
| D577,280 S | 9/2008 | Parker | |
| D577,987 S | 10/2008 | Corbin | |
| D593,842 S * | 6/2009 | Corbin ........................... | D8/353 |
| 7,554,036 B1 | 6/2009 | DeCosta | |
| 7,563,979 B1 * | 7/2009 | Gretz ........................ | H02G 3/14 174/66 |
| 7,654,405 B2 | 2/2010 | Provenzano et al. | |
| 7,692,094 B1 | 4/2010 | DeCosta | |
| 7,820,911 B1 | 10/2010 | Gretz | |
| 7,834,267 B1 | 11/2010 | Gretz | |
| 7,847,190 B1 | 12/2010 | Gretz | |
| D632,545 S | 2/2011 | DeCosta | |
| 7,897,870 B1 | 3/2011 | Gretz | |

(Continued)

*Primary Examiner* — Angel R Estrada
(74) *Attorney, Agent, or Firm* — Christopher S. Clancy; James H. Williams; Aimee E. McVady

(57) ABSTRACT

A faceplate assembly is disclosed. The faceplate assembly includes a cover and a backing plate. The cover has at least one hood positioned at an edge of the cover. The backing plate is connected to the cover. The hood creates an opening between the cover and the backing plate to enable cables to be routed therethrough. The backing plate also has an outer edge with a split to enable the backing plate to be installed over pre-installed cables.

5 Claims, 18 Drawing Sheets

(56) References Cited

U.S. PATENT DOCUMENTS

| | | |
|---|---|---|
| 8,097,805 B2 | 1/2012 | Drane et al. |
| 8,350,153 B1 | 1/2013 | DeCosta |
| 8,376,171 B2 | 2/2013 | Provenzano et al. |
| 8,404,973 B1 | 3/2013 | Gretz |
| 8,490,815 B2 | 7/2013 | Provenzano et al. |
| 8,853,534 B2 | 10/2014 | Wang |
| 2011/0259883 A1 | 10/2011 | DeCosta |

* cited by examiner

PASS THROUGH FACEPLATE

CROSS-REFERENCE TO RELATED APPLICATIONS

This application claims priority to U.S. Provisional Application No. 62/004,454, filed May 29, 2014, the subject matter of which is hereby incorporated by reference in its entirety.

FIELD OF THE INVENTION

The present invention relates to a pass through faceplate, and more particularly to a pass through faceplate that allows for the pre-installation of cables.

BACKGROUND OF THE INVENTION

Faceplates with various modules installed directly in the faceplate are well known. Faceplates having a copper jack, fiber, or audio visual module installed directly into the faceplate with two separate cables installed to complete the overall channel are known. In some applications, however, it is preferred to simply pass a cable directly through a wall or a ceiling.

One example is a pass through faceplate that has an opening in the faceplate where the cabling goes directly through the opening instead of having a module in the faceplate that serves as a transition between the inside and outside of the wall. A problem with this solution is that during installation, each cable needs to be individually fed through the faceplate. If the cable assembly includes large connectors, the installation process can be tedious and costly. Another problem is, if all cables have already been routed and connected during installation, the cables would need to be disconnected in order to install the faceplate since the faceplate cannot be placed over the cables. A further problem is that if the end user needs to re-route the cables in a different direction, the faceplate would need to be uninstalled from the wall or ceiling before the cables could be redirected.

As a result, there is a need for an improved pass through faceplate that allows for the installation of the faceplate after cables have already been installed. There is also a need for a pass through faceplate allowing for redirection of cables and aesthetic appeal.

SUMMARY OF THE INVENTION

The present invention is directed to a faceplate assembly. The faceplate assembly includes a cover and a backing plate connected to the cover. The cover includes at least one hood. The hood is positioned at an edge of the cover to create an opening between the cover and the backing plate for passing cables therethrough. The backing plate also has an outer edge with a split to enable the backing plate to be installed over pre-installed cables.

The present invention is also directed to a faceplate assembly with a cover plate a hood rotatably connected to the cover plate. The cover plate includes at least one opening for passing the cables therethrough and at least one latch positioned around the opening and extending from the cover plate. The hood has a ring that defines the circumference of the hood. The latch extending from the cover plate engages the ring of the hood and secures the hood to the cover plate. As a result, the hood is rotatable from 0 degrees to 360 degrees about a central axis of the cover plate.

DETAILED DESCRIPTION

Figure 1:
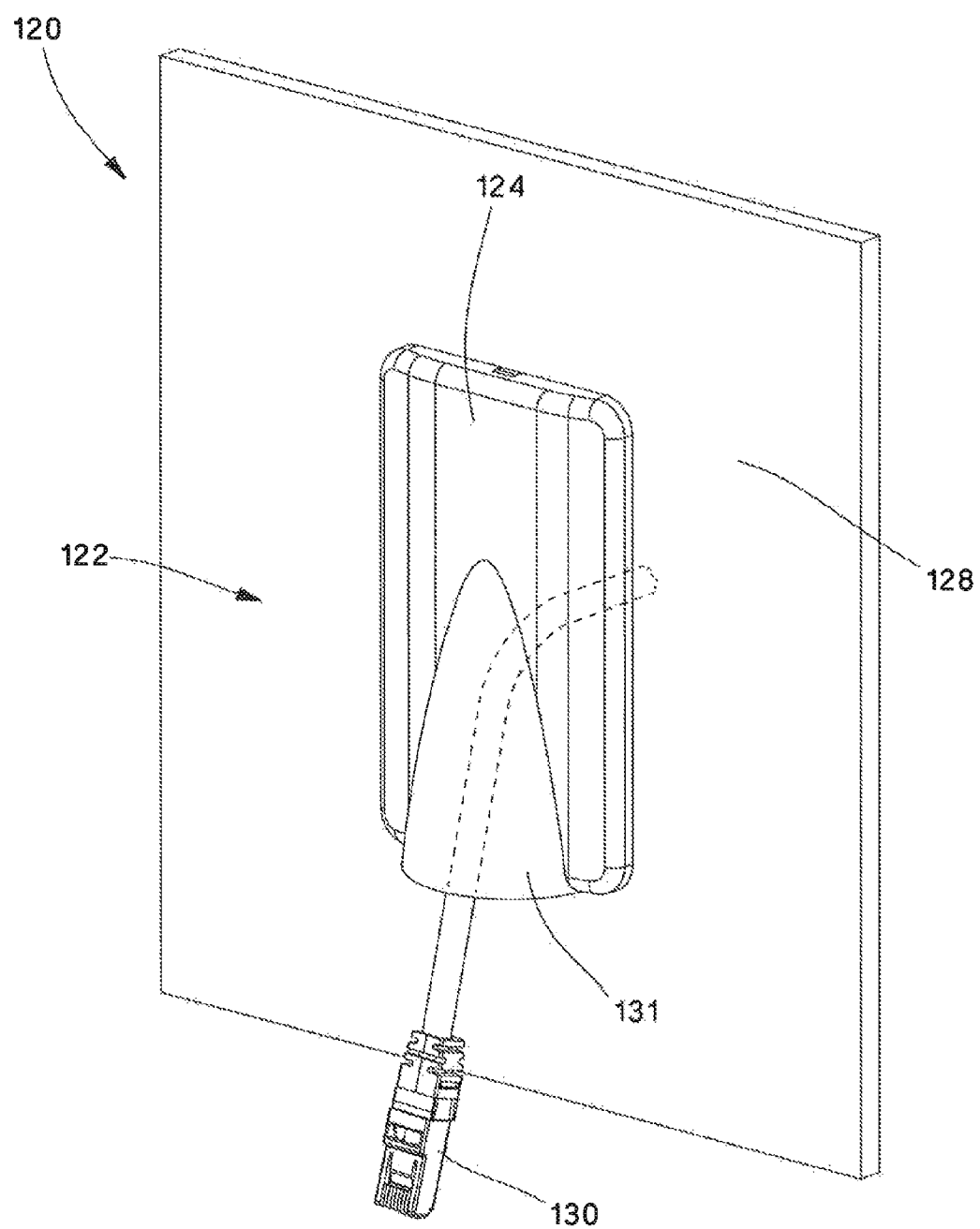
FIG. 1 is a perspective view of a first embodiment of the pass through faceplate of the present invention secured to a wall.
Figure 2:
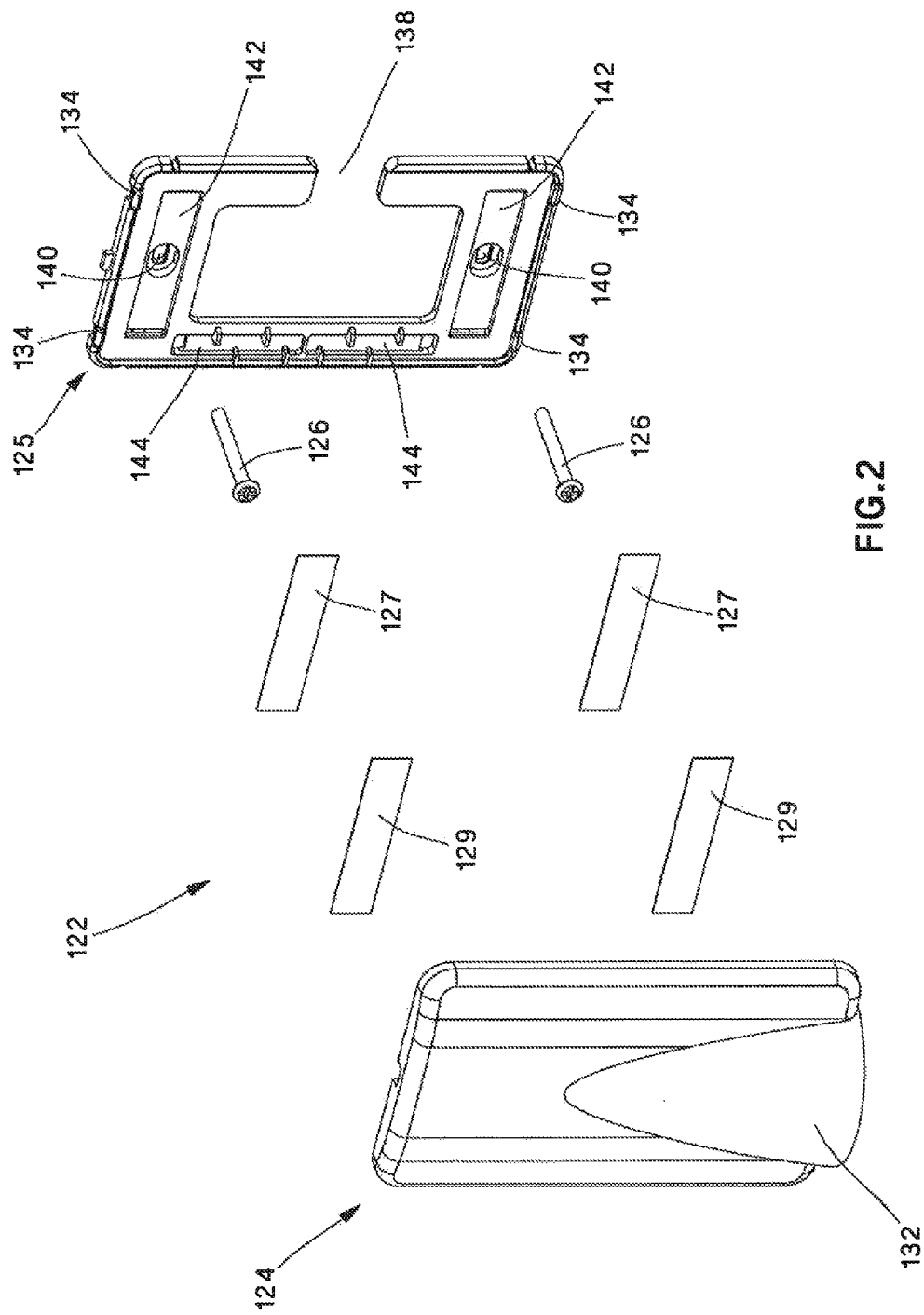
FIG. 2 is an exploded front perspective view of the pass through faceplate of FIG. 1.
Figure 3:
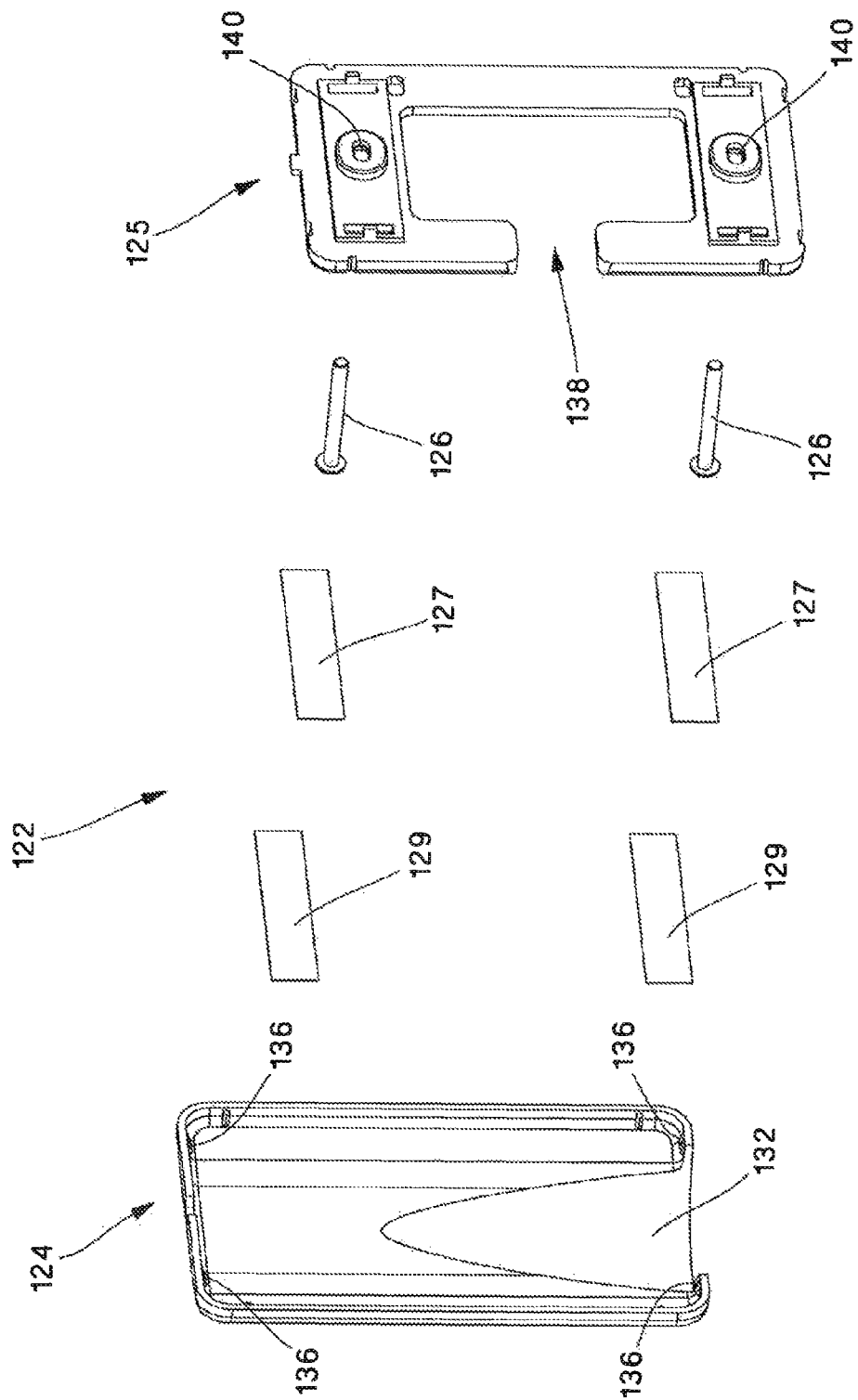
FIG. 3 is an exploded rear perspective view of the pass through faceplate of FIG. 1.

FIGS. 1-3 illustrate a first embodiment of the pass through faceplate of the present invention. The communication system 120 includes a faceplate assembly 122 secured to a wall 128 via screws 126. The faceplate assembly includes a faceplate cover 124, a faceplate backing 125, labels 127 and label covers 129. The faceplate cover 124 includes a hood 132 that creates an opening 131 between the faceplate cover 124 and the faceplate backing 125. The faceplate cover 124 also includes a plurality of latches 136 (see FIG. 3). The latches 136 enable the faceplate cover 124 to be secured to the faceplate backing 125.

As illustrated in FIGS. 2 and 3, the faceplate backing 125 includes latch slots 134 at the top and bottom of the faceplate backing 125. The slots 134 align with the latches 136 on the faceplate cover 124 (see FIG. 3) The faceplate backing 125 includes a split 138 for enabling the installation of the faceplate backing 125 after cables have already been installed. The faceplate backing 125 also includes screw holes 140, label slots 142 and screw retention slots 144. The screws 126 align with the screw holes 140 in the faceplate backing 125. The label slots 142 allow for installation of labels 127 and label covers 129. The screw retention slots 144 secure the screws 126 during packaging. Since the hood 132 creates an opening 131 between the faceplate cover 124 and the faceplate backing 125, the faceplate cover 124 can be installed after cables have already been installed.

A cable assembly 130 is illustrated extending through the opening 131 between the faceplate cover 124 and the faceplate backing 125. The cable assembly 130 can include, but is not limited to, RJ45 cabling, audio visual cabling, fiber cabling and power cabling. Although FIG. 1 only illustrates one cable assembly 130, a plurality of cable assemblies 130 can pass through the opening 131 of the faceplate assembly 122.

Figure 4:
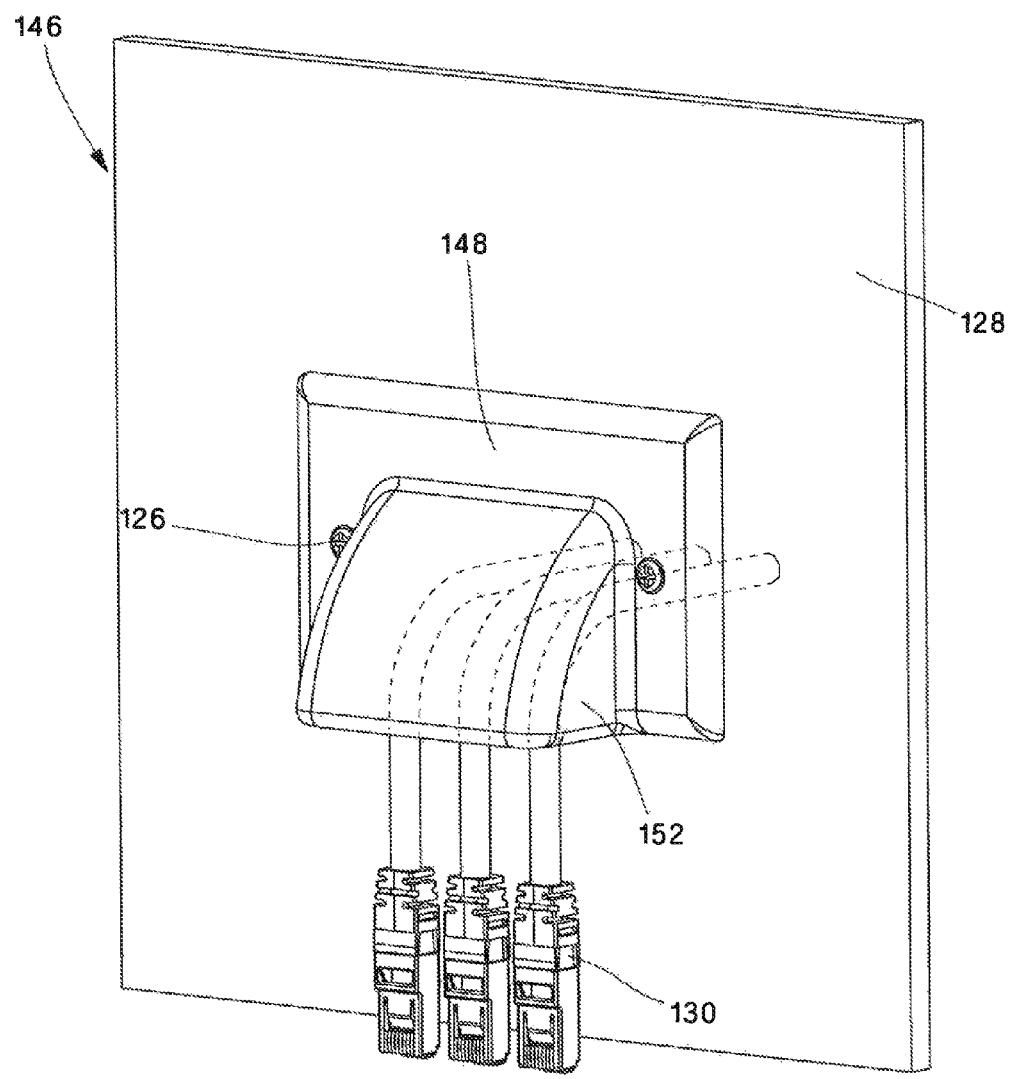
FIG. 4 is a perspective view of a second embodiment of the pass through faceplate of the present invention secured to a wall.
Figure 5:
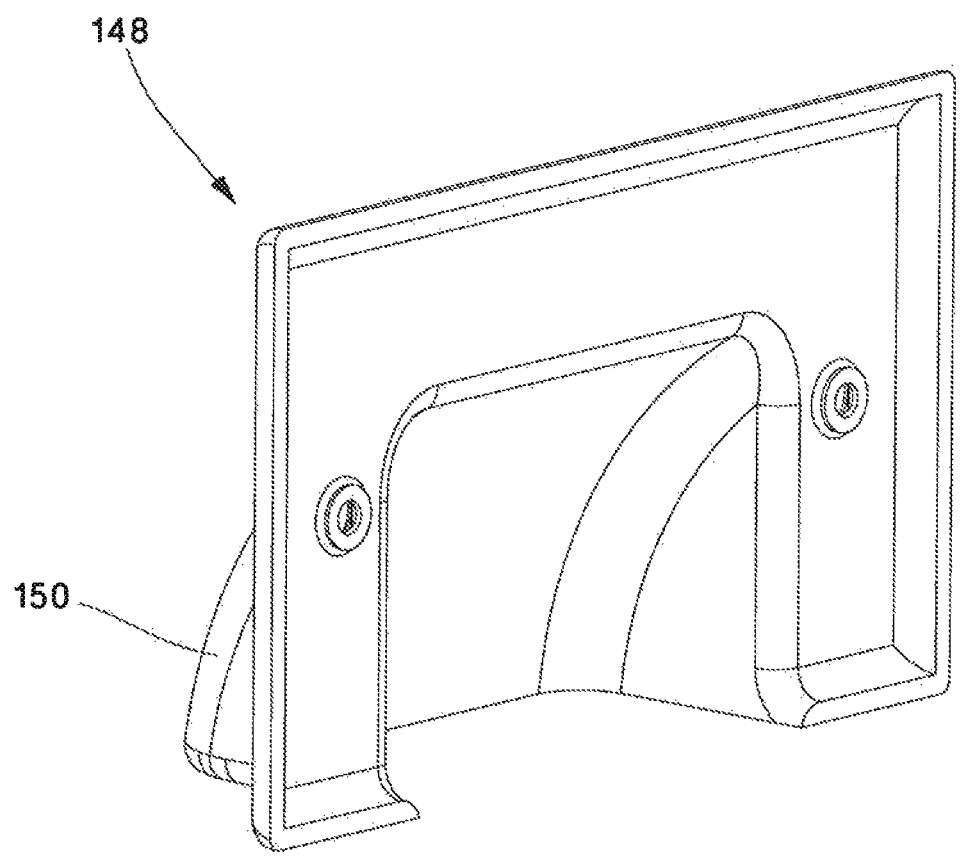
FIG. 5 is a rear perspective view of the pass through faceplate of FIG. 4.

FIGS. 4 and 5 illustrate a second embodiment of the pass through faceplate of the present invention. The communication system 146 includes a faceplate 148, screws 126 to secure the faceplate 148 to a wall 128, at least one cable assembly 130 and an outlet box (not illustrated). The faceplate 148 includes a hood 150 (see FIG. 5) that creates an opening 152 between the faceplate 148 and the wall 128 which allows for the passing of cable assemblies 130 before or after installation of the faceplate 148. If desired, the faceplate 148 may also include a label pocket (not illustrated) on the front of the faceplate 148 to house a label and label cover.

Figure 6:
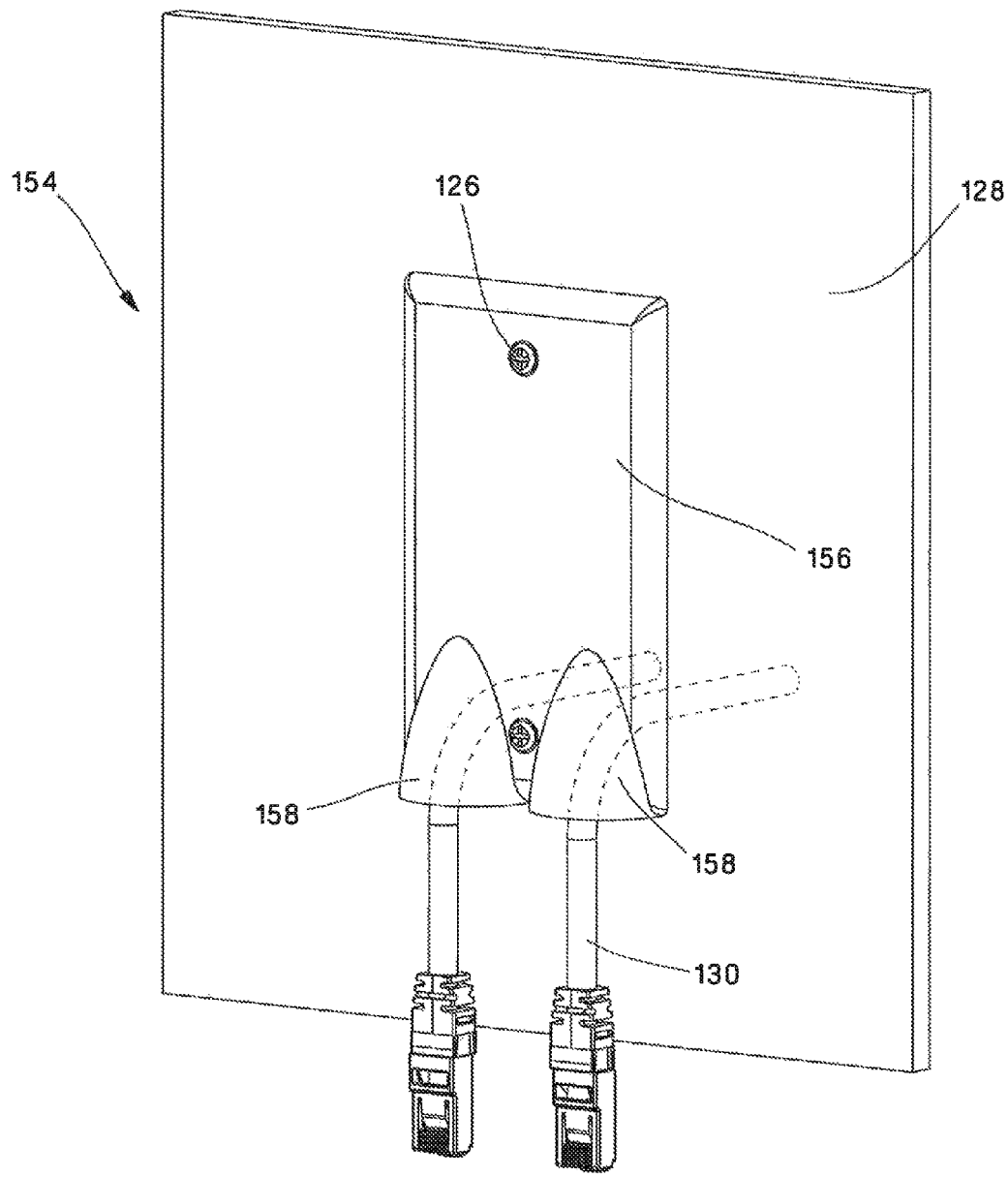
FIG. 6 is a perspective view of a third embodiment of the pass through faceplate of the present invention secured to a wall.
Figure 7:
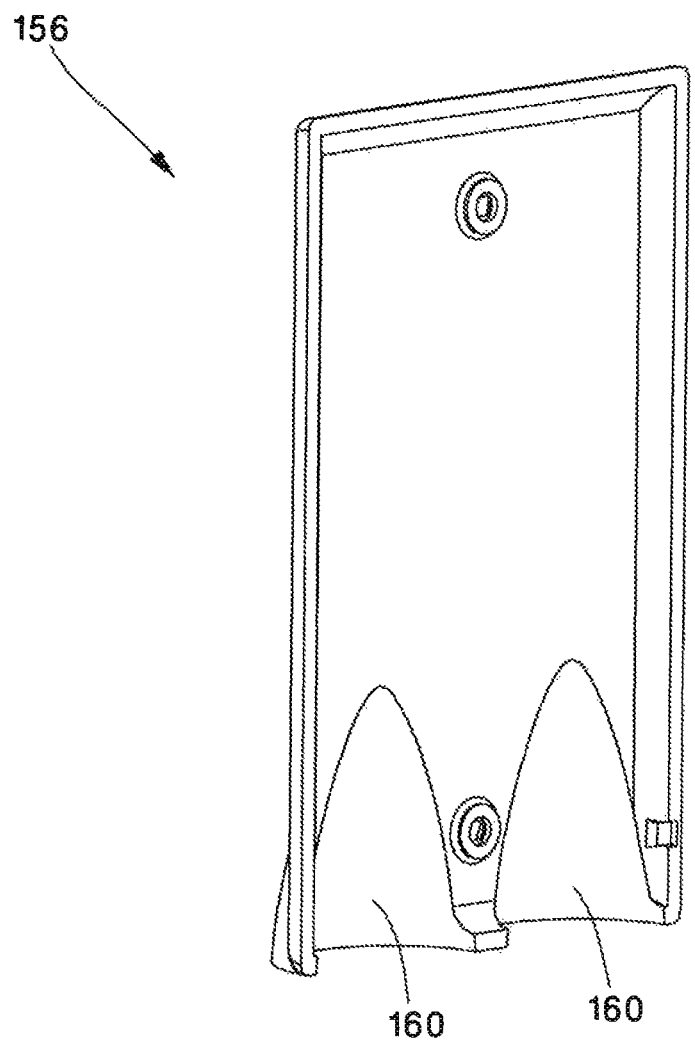
FIG. 7 is a rear perspective view of the pass through faceplate of FIG. 6.

FIGS. 6 and 7 illustrate a third embodiment of the pass through faceplate of the present invention. The communication system 154 includes a faceplate 156, screws 126 to secure the faceplate to the wall 128, cable assemblies 130 and an outlet box (not illustrated). The faceplate 156 includes two hoods 158 that create openings 160 between the wall 128 and the faceplate 156 to allow for the passing of the cable assemblies 130 before or after installation of the faceplate 156. If desired, the faceplate 156 may also include a label pocket (not illustrated) on the front of the faceplate 156 to house a label and label cover.

FIGS. 8-13 illustrate a fourth embodiment of the pass through faceplate of the present invention. The communication system 220 includes a faceplate assembly 222, screws 226, wall 228, at least one cable assembly 230 and an outlet box (not illustrated). The faceplate assembly 222 includes a faceplate cover 224 and a cable hood 225.

A cable assembly 230 is illustrated extending through the opening of the faceplate cover 224. The cable assembly 230 can include, but is not limited to, RJ45 cabling, audio visual cabling, fiber cabling and power cabling. Although FIG. 8 only illustrates one cable assembly 230, a plurality of cable assemblies 230 can pass through the cable hood 225 of the faceplate assembly 222.

Figure 8:
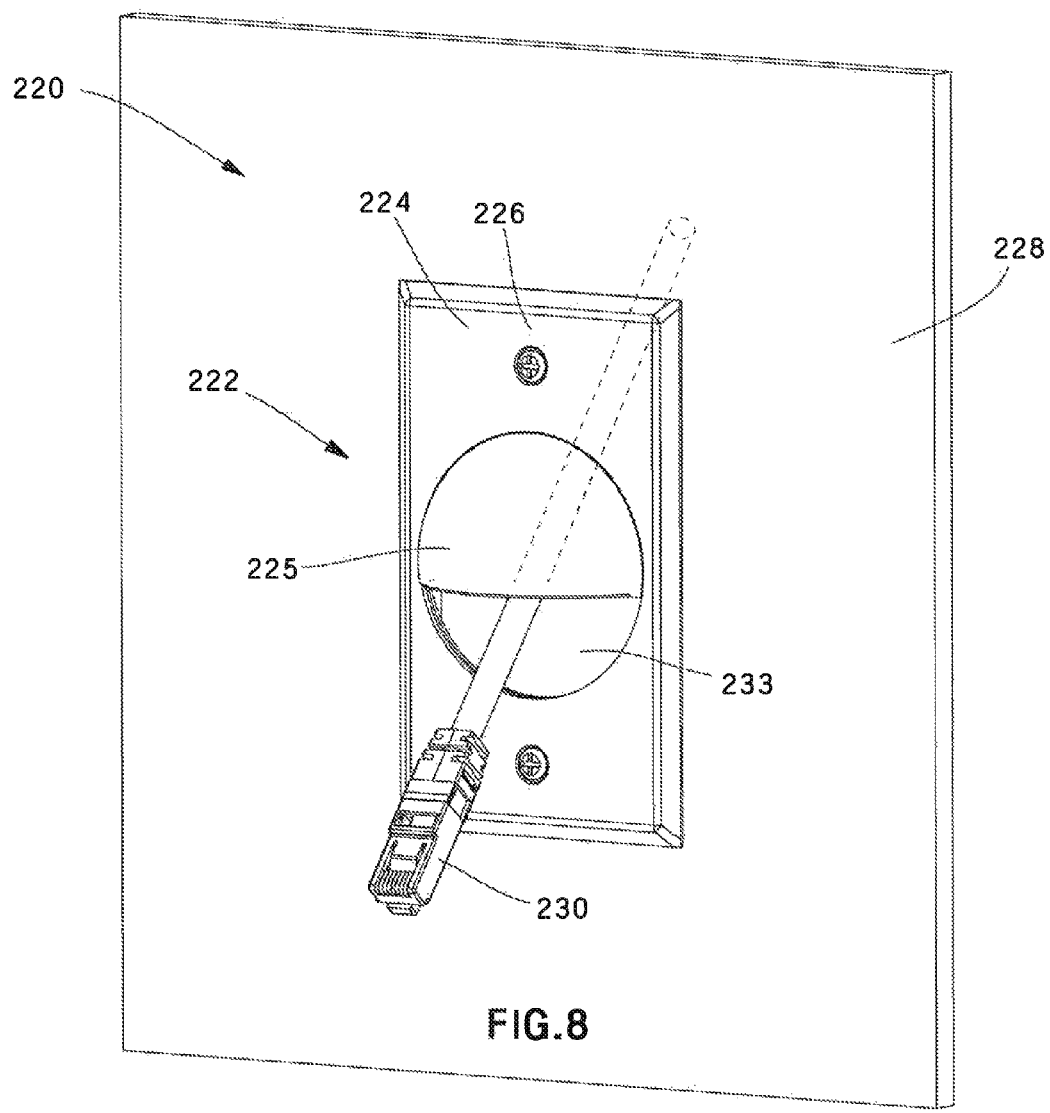
FIG. 8 is a perspective view of a fourth embodiment of the pass through faceplate of the present invention secured to a wall.
Figure 9:
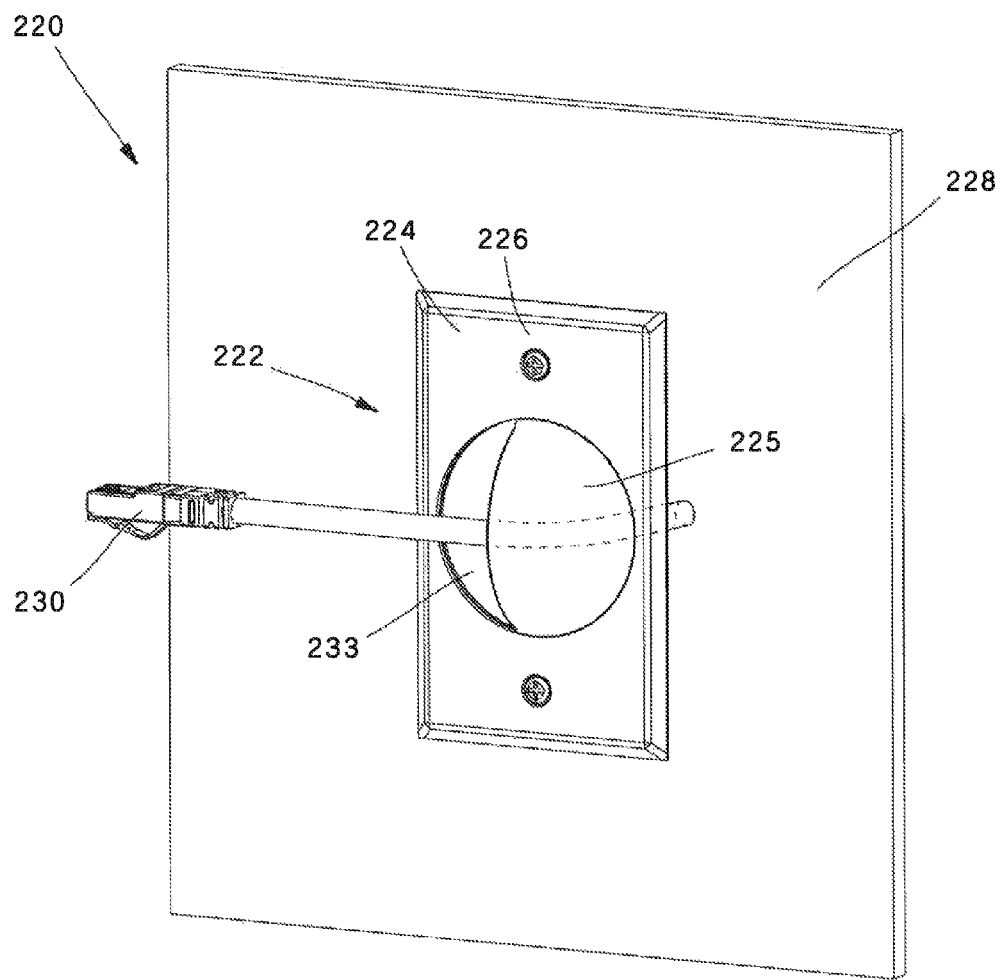
FIG. 9 is a perspective view of the pass through faceplate of FIG. 8 with the cable hood rotated to direct cable assemblies in a horizontal orientation.

FIG. 8 illustrates the faceplate assembly 222 directing cable assembly 230 in a downwards or 180° orientation. FIG. 9 illustrates the faceplate assembly 222 directing cable assembly 230 in a horizontal or 270° orientation. The faceplate assembly 222 is designed with the cable hood 225 capable of rotating to direct the cable assembly 230 in any direction from 0° to 360°.

Figure 10:
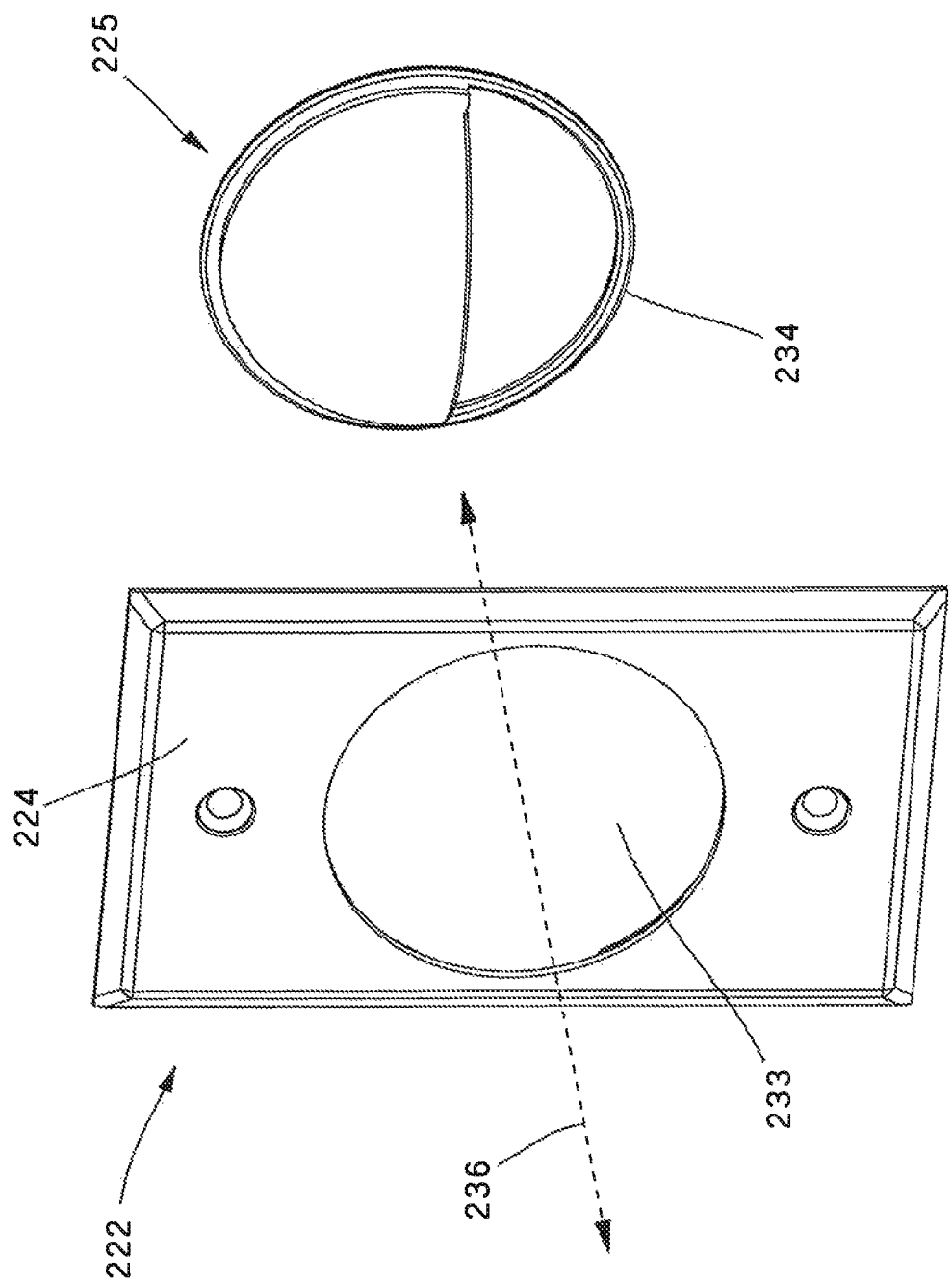
FIG. 10 is a front perspective exploded view of the pass through faceplate of FIG. 8.
Figure 11:
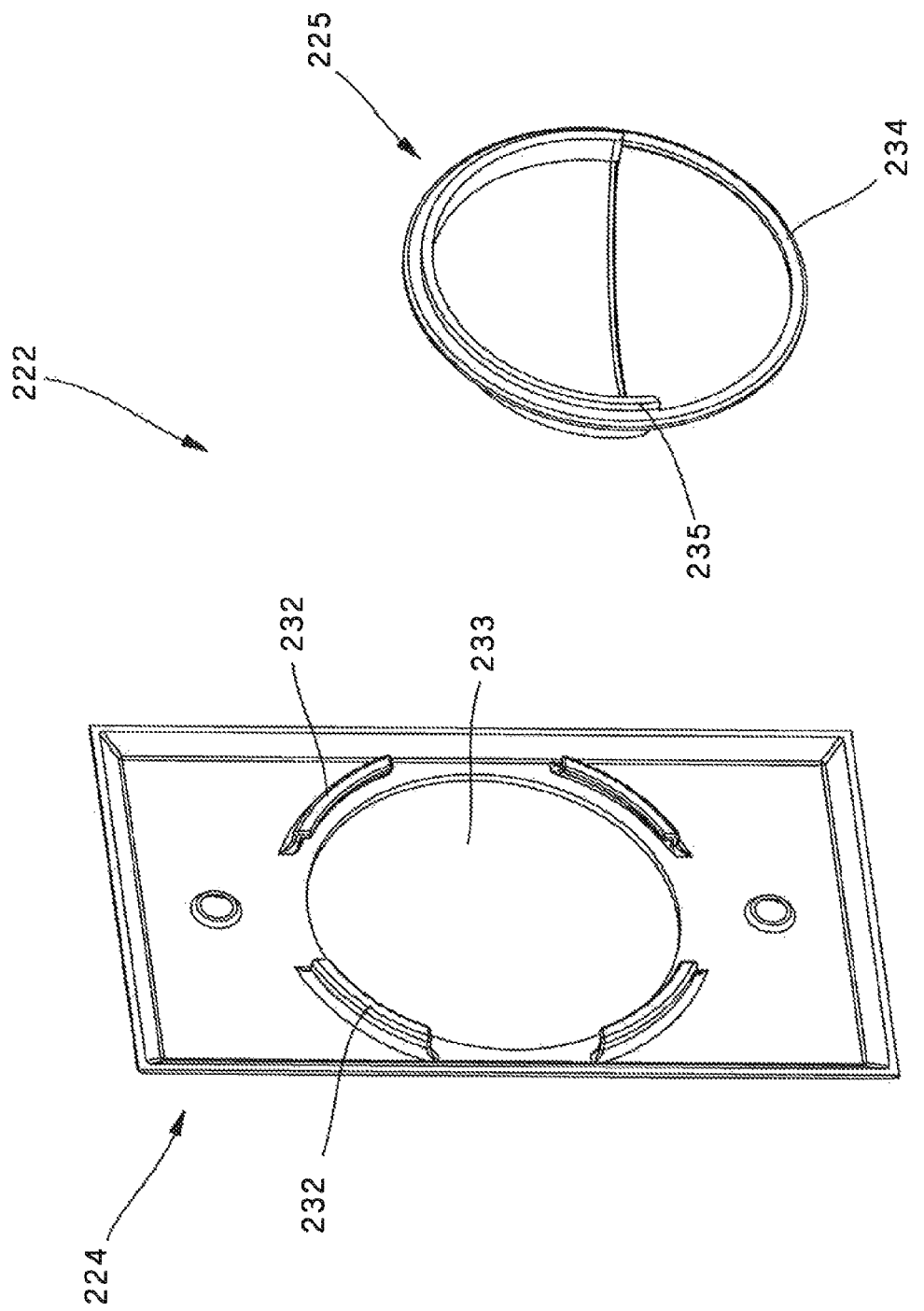
FIG. 11 is a rear perspective exploded view of the pass through faceplate of FIG. 8.

FIGS. 10 and 11 illustrate an exploded view of the faceplate assembly 222. The faceplate cover 224 includes screw holes for receiving screws 226 to secure the faceplate cover 224 to a wall 228. The faceplate cover 224 also includes a center circular opening 233 for receiving the cable hood 225 and latches 232 (see FIG. 11) extending from the rear of the faceplate cover 224. The latches 232 are positioned around the circular opening 233.

The cable hood 225 includes a ring 234 that defines the circumference of the cable hood 225. The cable hood 225 is secured to the faceplate cover 224 via the latches 232 which align with and engage the ring 234 of the cable hood 225. Once the cable hood 225 is secure, it is free to rotate from 0° to 360° about central axis 236 to direct a cable assembly 230 through the opening 233 in various orientations. The cable hood 225 also includes a platform 235 (see FIG. 11) extending in a direction opposite the cable hood 225.

Figure 12:
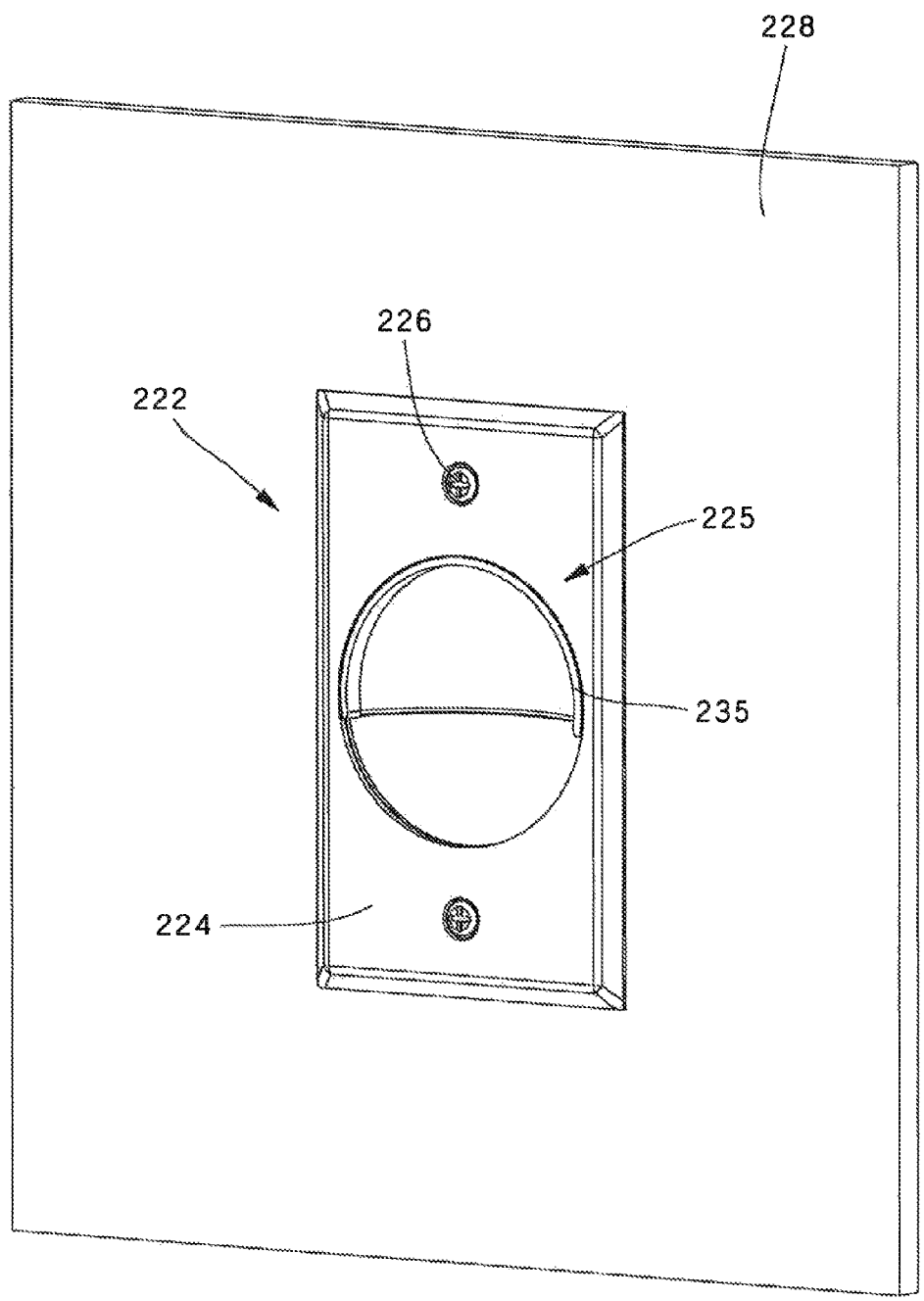
FIG. 12 is a perspective view of the pass through faceplate of FIG. 8 with the cable hood installed inwards.
Figure 13:
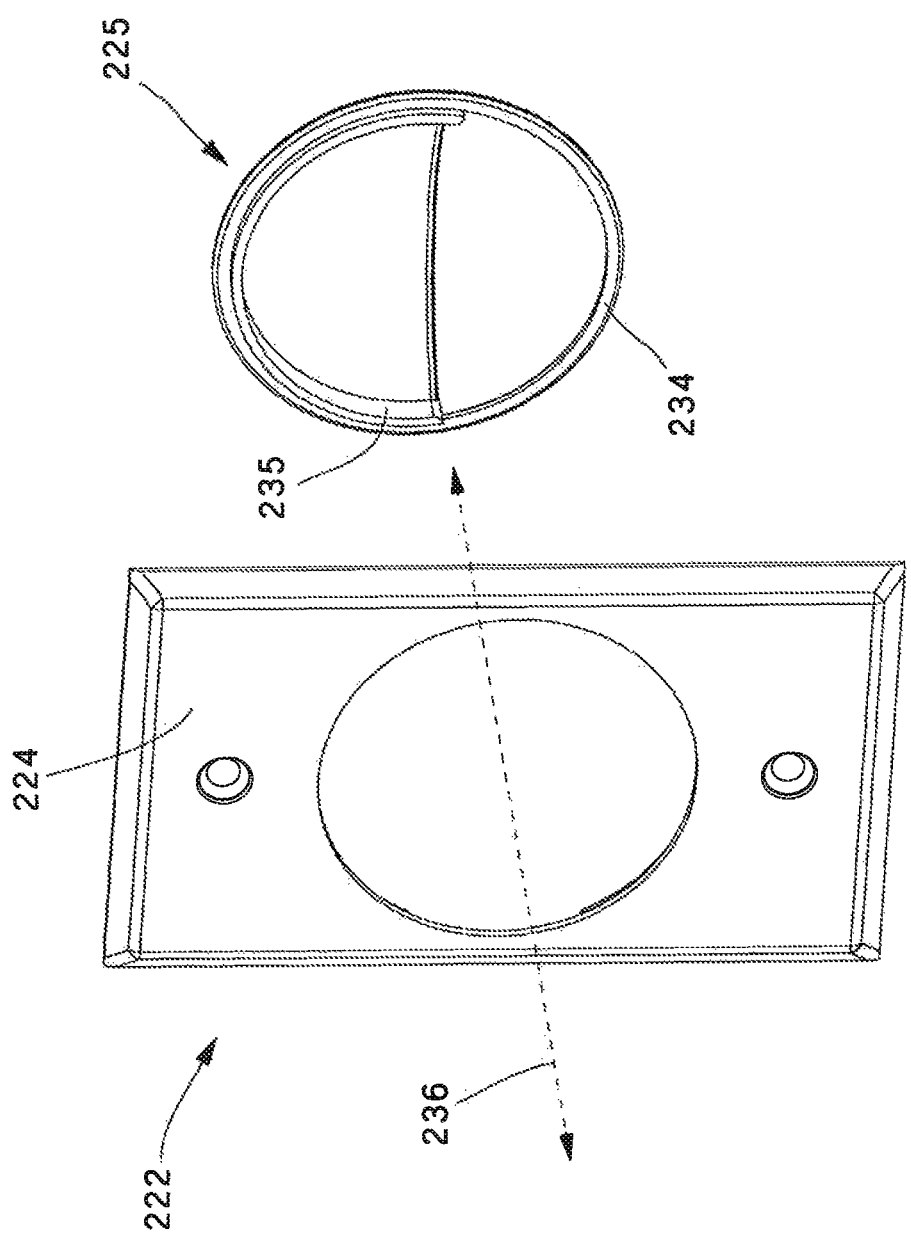
FIG. 13 is a front perspective exploded view of the pass through faceplate of FIG. 12.

FIG. 12 illustrates the faceplate assembly 222 attached to wall 228 with the cable hood 225 installed inwards. FIG. 13 illustrates an exploded view of faceplate assembly 222 with the cable hood 225 positioned to be installed inwards. When the cable hood 225 is installed inwards, the cable hood 225 is hidden behind the faceplate cover 224. The platform 235 keeps the cable hood 225 flush with the front of the faceplate cover 224. The cable hood 225 is still capable of rotation from 0° to 360° about central axis 236 thereby enabling the cable assembly to be directed through the opening in various orientations.

Figure 14:
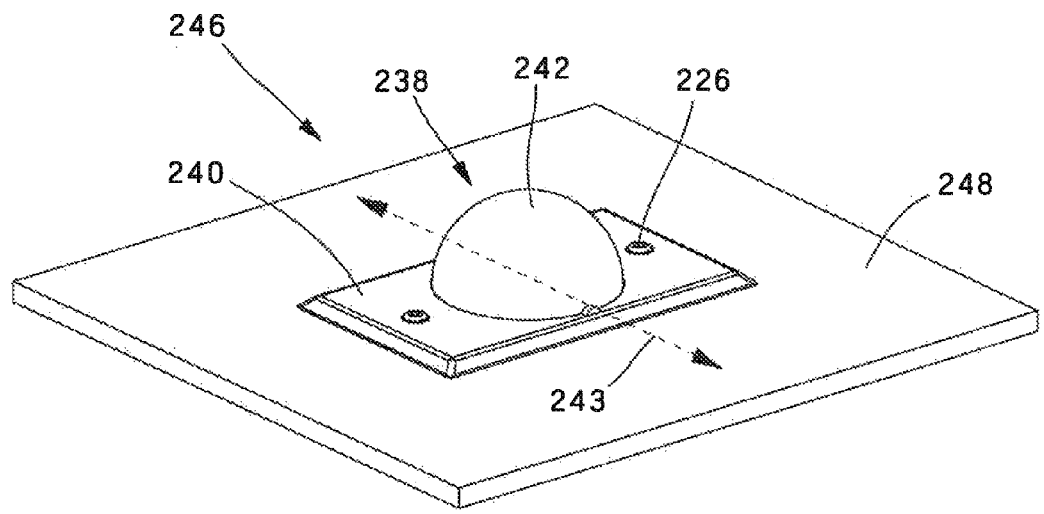
FIG. 14 is a perspective view of a fifth embodiment of the pass through faceplate of the present invention.
Figure 15:
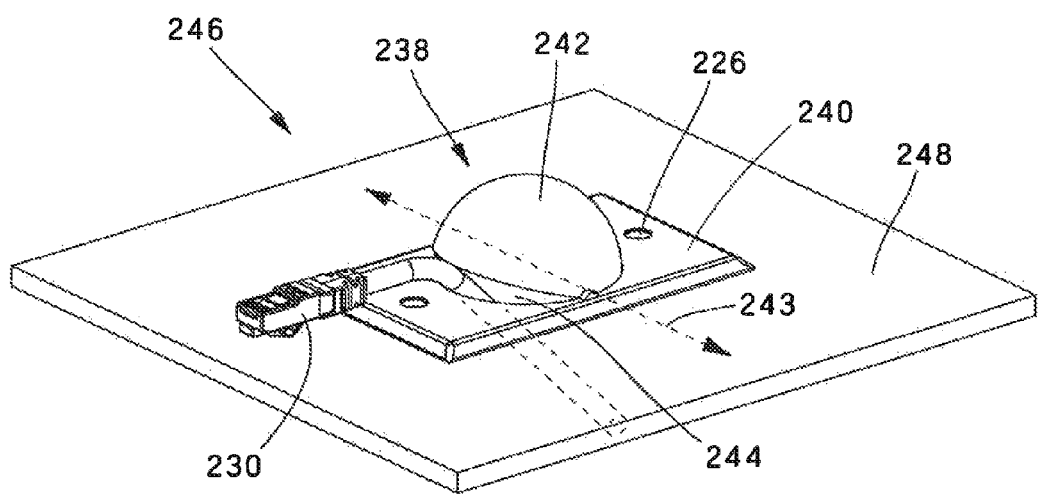
FIG. 15 is a perspective view of the pass through faceplate of FIG. 14 with the dome hood rotated to direct a cable assembly.
Figure 16:
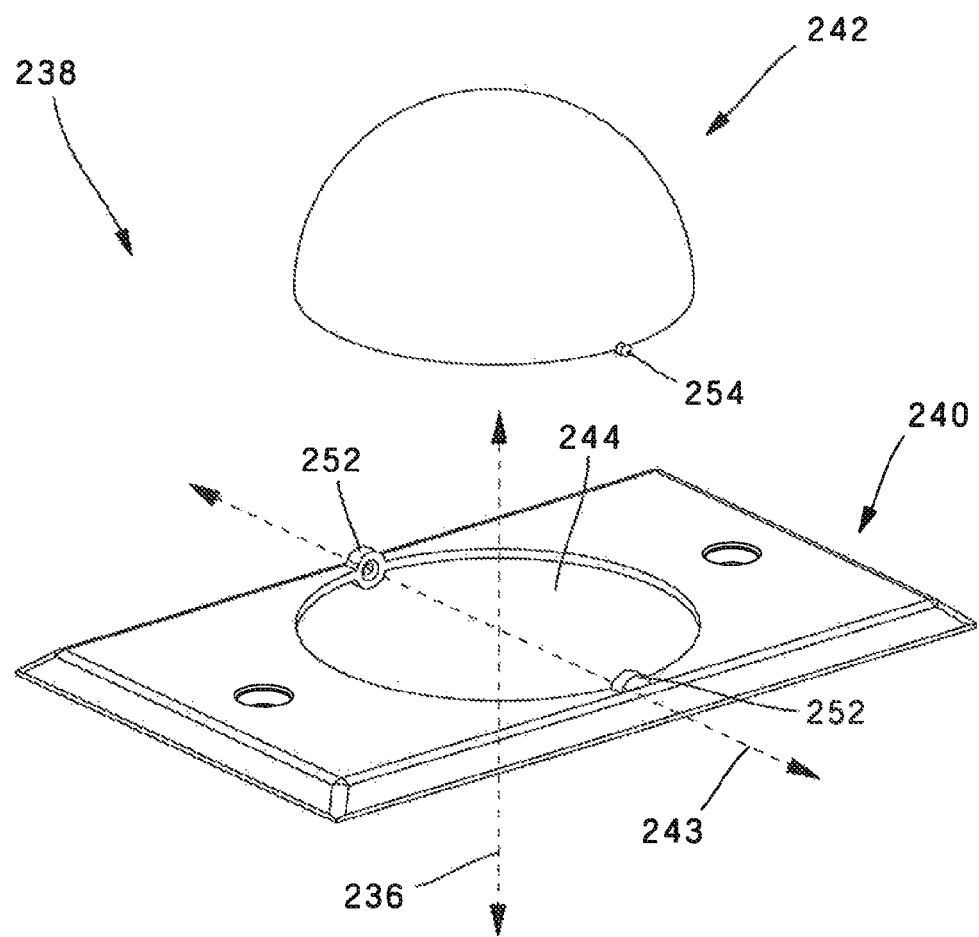
FIG. 16 is an exploded view of the pass through faceplate of FIG. 14.
Figure 17:
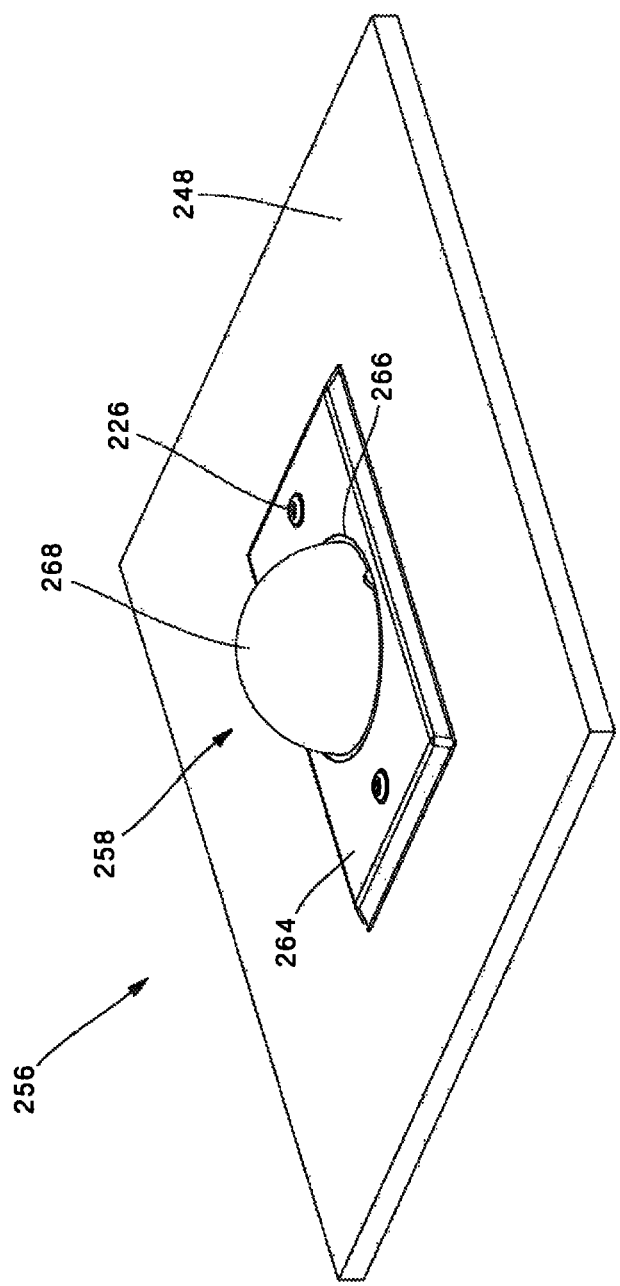
FIG. 17 is a perspective view of a sixth embodiment of the pass through faceplate of the present invention.

FIGS. 14-16 illustrate a fifth embodiment of the pass through faceplate of the present invention. The communication system 246 includes a faceplate assembly 238, screws 226, ceiling 248 and at least one cable assembly 230. The faceplate assembly 238 includes a faceplate cover 240 and a dome hood 242. As illustrated in FIG. 16, the faceplate cover 240 includes two holes for receiving screws 236 and a central circular opening 244. The faceplate cover 240 also includes mounting holes 252 positioned along the diameter axis 243 that extends across the center of the circular opening 244. The dome hood 242 includes two mounting posts 254 positioned opposite or 180° from each other. The mounting posts 254 of the dome hood 242 are positioned within the mounting holes 252 of the faceplate cover 240 to form the faceplate assembly 238. The mounting posts 254 enable the dome hood 242 to rotate about the diameter axis 243 to direct the cable assemblies 230 in a desired orientation.

As illustrated in FIG. 15, the dome hood 242 rotates just enough to allow the cable assembly 230 to go through circular opening 244. As discussed above, the cable assembly 230 can include, but is not limited to, RJ45 cabling, audio visual cabling, fiber cabling and power cabling. A plurality of cable assemblies 230 can also pass through the dome hood 242 of the faceplate assembly 238.

Additionally, if desired, the faceplate cover 240 may be design with the mounting holes 252 and the diameter axis 243 rotated with respect to the central axis 236 to allow for any axis of rotation around the circular opening 244.

FIGS. 17-20 illustrate a sixth embodiment of the pass through faceplate of the present invention. The communication system 256 includes a faceplate assembly 258, screws 226, ceiling 248 and at least one cable assembly 230. The faceplate assembly 258 combines the aspects of faceplate assembly 222 and faceplate assembly 238 to allow for rotation about two different axes simultaneously.

The faceplate assembly 258 includes a faceplate cover 264, a spinner 266 and a rotational hood 268. The faceplate cover 264 includes two holes for receiving screws 226 to mount the faceplate cover 264 to the ceiling 248, a center circular opening 260 and a plurality of latches 270 extending from the rear of the faceplate cover 264 (see FIG. 20). FIG.

20 illustrates the rear of the faceplate cover 264, the spinner 266 and the rotational hood 268. The spinner 266 includes mounting holes 272 positioned along diameter axis 243 across from each other. The rotational hood 268 includes mounting posts 274 positioned across from each other.

Figure 18:
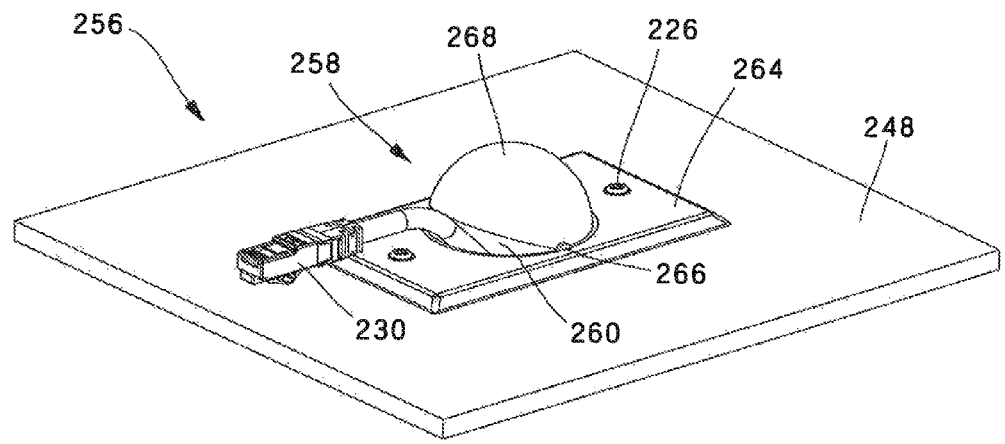
FIG. 18 is a perspective view of the pass through faceplate of FIG. 17 with the hood rotated to direct a cable assembly.
Figure 19:
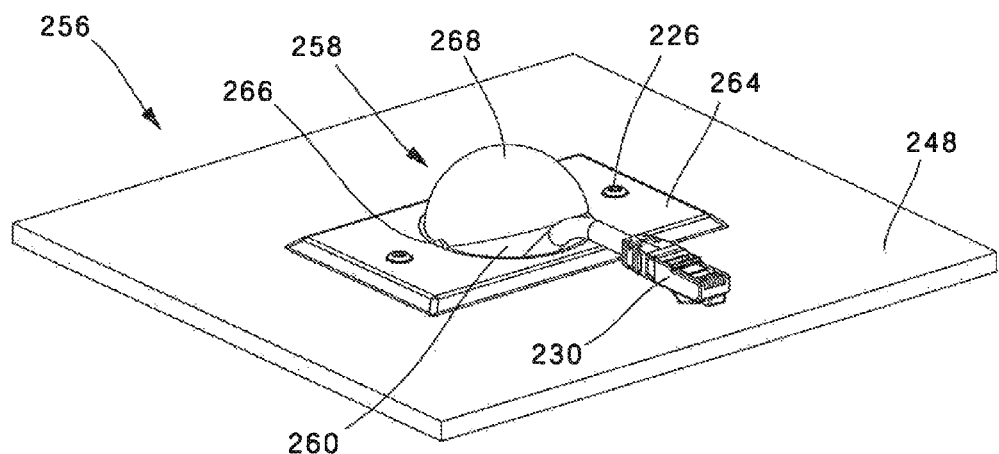
FIG. 19 is a perspective view of the pass through faceplate of FIG. 17 with the hood rotated to direct a cable assembly.
Figure 20:
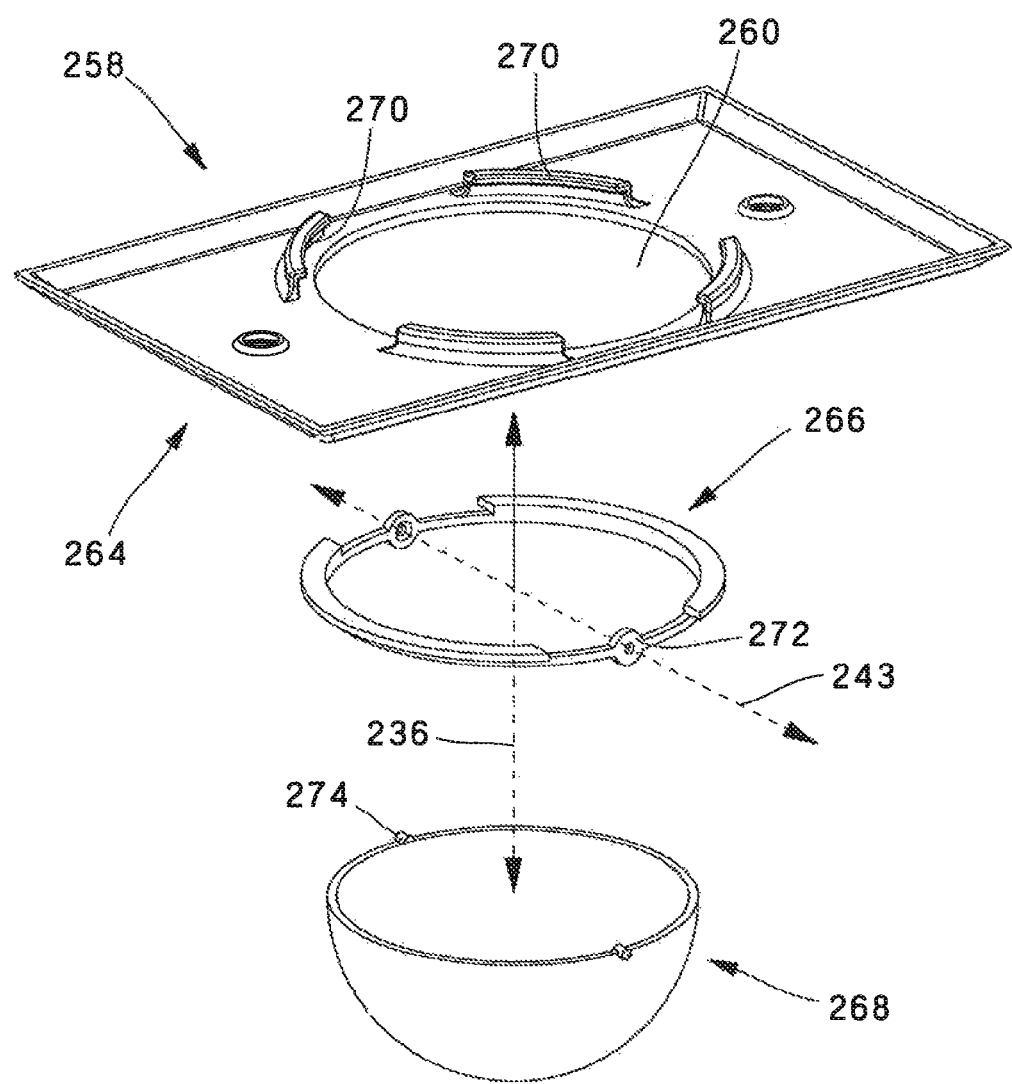
FIG. 20 is a rear perspective exploded view of the pass through faceplate of FIG. 17.

FIG. 18 illustrates the faceplate assembly 258 mounted to ceiling 248 and cable assembly 230 placed through the opening 260. FIG. 19 illustrates the faceplate assembly 258 mounted to ceiling 248 and cable assembly 230 placed through the opening 260, with the spinner 266 rotated 90° to allow cable entry from a different orientation.

The spinner 266 rotates about central axis 236 and is contained by latches 270 on the faceplate cover 264. The mounting holes 272 in the spinner 266 receive the mounting posts 274 extending from the rotational hood 268. The rotational hood 268 can rotate from 0 to 360 about the diameter axis 243 once it is installed in the faceplate cover 264. Additionally, the rotation of the spinner 266 about the central axis 236 rotates the diameter axis 243, accordingly, to provide cable entry and exit from various directions.

The embodiments of the pass through faceplate of the present invention have a hooded opening that allows for the installation of the faceplate after cables have already been installed. The pass through faceplate of the present invention provides labeling options for communication purposes and hidden screw holes for improved aesthetics. The pass through faceplate of the present invention also has a hooded opening that can be rotated for redirection of the cable assemblies. Alternatively, the pass through faceplate has a hooded opening that may be flipped inwards to allow for a recessed hood design.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A faceplate assembly for passing cables therethrough, comprising:
   a cover including at least one hood, the at least one hood positioned at an edge of the cover; and
   a backing plate connected to the cover, the backing plate having an outer edge with a split for enabling the installation of the backing plate over cables after the cables have been installed, wherein the backing plate includes at least one label pocket for receiving a label and a plurality of screw holes, wherein the cover conceals the plurality of screw holes when connected to the backing plate,
   wherein the at least one hood creates an opening between the cover and the backing plate for passing cables therethrough.

2. The faceplate assembly of claim 1, wherein the backing plate having at least one center opening for routing the cables therethrough.

3. The faceplate assembly of claim 1, wherein the backing plate is c-shaped.

4. The faceplate assembly of claim 1, wherein the cover includes a plurality of latches and the backing plate includes a plurality of latch slots, wherein the latch slots receive the latches to secure the cover to the backing plate.

5. The faceplate assembly of claim 1, wherein the cover includes two hoods adjacent each other.

* * * * *